(12) United States Patent
Abele et al.

(10) Patent No.: US 10,471,467 B2
(45) Date of Patent: Nov. 12, 2019

(54) LIGHTING ARRANGEMENT

(71) Applicant: North Inc., Kitchener (CA)

(72) Inventors: Nicolas Abele, Demoret (CH); Lucio Kilcher, Montreux (CH)

(73) Assignee: North Inc., Kitchener, ON (CA)

( * ) Notice: Subject to any disclaimer, the term of this patent is extended or adjusted under 35 U.S.C. 154(b) by 44 days.

(21) Appl. No.: 14/335,641

(22) Filed: Jul. 18, 2014

(65) Prior Publication Data

US 2016/0018066 A1      Jan. 21, 2016

(51) Int. Cl.

| | |
|---|---|
| *F21S 41/16* | (2018.01) |
| *F21S 41/33* | (2018.01) |
| *B29D 11/00* | (2006.01) |
| *F21K 9/64* | (2016.01) |
| *B05D 5/06* | (2006.01) |
| *F21S 41/37* | (2018.01) |
| *F21S 41/675* | (2018.01) |

(Continued)

(52) U.S. Cl.
CPC .......... *B05D 5/06* (2013.01); *B29D 11/00336* (2013.01); *B29D 11/00605* (2013.01); *F21K 9/64* (2016.08); *F21S 41/14* (2018.01); *F21S 41/16* (2018.01); *F21S 41/337* (2018.01); *F21S 41/37* (2018.01); *F21S 41/675* (2018.01); *B29C 59/02* (2013.01); *B29D 11/00865* (2013.01); *B29L 2011/0083* (2013.01); *F21Y 2101/00* (2013.01); *F21Y 2115/30* (2016.08); *G03B 21/204* (2013.01); *G03B 21/208* (2013.01); *G03B 2215/0567* (2013.01)

(58) Field of Classification Search
CPC ..... B05D 5/06; B29C 59/02; B29D 11/00336; B29D 11/00605; B29D 11/00865; B29L 2011/0083; F21S 48/00; G03B 21/204; G03B 21/208; G03B 2215/0567
USPC ................ 362/84; 359/576, 15, 321, 485.03, 359/486.01, 489.11
See application file for complete search history.

(56) References Cited

U.S. PATENT DOCUMENTS

| | | | |
|---|---|---|---|
| 2,440,584 A * | 4/1948 | Heltzer ................. | G02B 5/128 359/540 |
| 4,816,846 A * | 3/1989 | Kollarits .............. | G06K 15/129 347/232 |

(Continued)

FOREIGN PATENT DOCUMENTS

WO        2001/053562 A1        4/2014

OTHER PUBLICATIONS

Office Action and Search Report received for Taiwanese Patent Application No. 104122555, dated Sep. 9, 2016, 15 pages including 8 pages English translation.

(Continued)

*Primary Examiner* — Tsion Tumebo
(74) *Attorney, Agent, or Firm* — Thomas Mahon

(57) ABSTRACT

A lighting system with a laser light source for radiating light; a wavelength conversion element for receiving the radiated light from the light source and for re-emitting wavelength converted white light; and a reflector element for reflecting the light received from the wavelength conversion element is disclosed. The reflector element comprises a reflective surface and a micro-patterned surface comprising an array of micro-focal elements. Each micro-focal elements is configured to converge or diverge incident light from the wavelength conversion element.

14 Claims, 4 Drawing Sheets

(51) Int. Cl.
*F21S 41/14* (2018.01)
*B29L 11/00* (2006.01)
*B29C 59/02* (2006.01)
*G03B 21/20* (2006.01)
*F21Y 101/00* (2016.01)
*F21Y 115/30* (2016.01)

(56) References Cited

U.S. PATENT DOCUMENTS

| | | | | |
|---|---|---|---|---|
| 5,818,555 | A * | 10/1998 | Yokoyama | G02B 6/0043 349/67 |
| 6,151,166 | A * | 11/2000 | Matsushita | G02B 5/1814 349/5 |
| 6,329,966 | B1 * | 12/2001 | Someya | G09G 3/02 345/22 |
| 6,628,355 | B1 * | 9/2003 | Takahara | G02F 1/1334 348/E9.027 |
| 6,827,458 | B2 * | 12/2004 | Suga | G02F 1/133615 349/65 |
| 6,849,308 | B1 * | 2/2005 | Speakman | G03F 7/16 427/422 |
| 6,981,792 | B2 * | 1/2006 | Nagakubo | G02B 6/0036 362/23.15 |
| 7,537,372 | B2 * | 5/2009 | Sugimoto | G02B 6/0055 362/617 |
| 7,777,960 | B2 * | 8/2010 | Freeman | H04N 9/3129 345/7 |
| 8,192,067 | B2 * | 6/2012 | Sato | G02B 6/0038 362/620 |
| 8,294,993 | B2 * | 10/2012 | Niesten | G02B 5/26 359/589 |
| 8,408,775 | B1 * | 4/2013 | Coleman | F21V 7/04 362/602 |
| 2002/0153422 | A1 * | 10/2002 | Tsikos | G06K 7/10742 235/454 |
| 2003/0113766 | A1 * | 6/2003 | Pepper | B01L 3/5085 435/6.11 |
| 2004/0085749 | A1 | 5/2004 | Parker et al. | |
| 2004/0114366 | A1 | 6/2004 | Smith et al. | |
| 2004/0121568 | A1 * | 6/2004 | Kim | H01L 51/0004 438/584 |
| 2004/0212757 | A1 * | 10/2004 | Lee | G02B 6/0038 349/64 |
| 2006/0007113 | A1 | 1/2006 | Hwang et al. | |
| 2006/0221022 | A1 * | 10/2006 | Hajjar | G09G 3/02 345/84 |
| 2006/0291064 | A1 | 12/2006 | Yao et al. | |
| 2007/0014318 | A1 * | 1/2007 | Hajjar | B82Y 10/00 372/9 |
| 2007/0103747 | A1 * | 5/2007 | Powell | G02B 13/22 359/13 |
| 2007/0139956 | A1 * | 6/2007 | Sugimoto | G02B 6/0055 362/600 |
| 2008/0285309 | A1 * | 11/2008 | Fang | G02B 6/0016 362/620 |
| 2009/0086509 | A1 * | 4/2009 | Omori | G02B 6/0036 362/628 |
| 2010/0027294 | A1 * | 2/2010 | Lee | G02B 5/02 362/620 |
| 2010/0104812 | A1 * | 4/2010 | Sung | B29D 11/00663 428/156 |
| 2010/0202129 | A1 * | 8/2010 | Abu-Ageel | C09K 11/7734 362/84 |
| 2010/0328617 | A1 * | 12/2010 | Masuda | G03B 21/14 353/31 |
| 2011/0002058 | A1 | 1/2011 | Leonhardt | |
| 2011/0222149 | A1 * | 9/2011 | Saito | G03B 21/204 359/443 |
| 2013/0058114 | A1 * | 3/2013 | Reiners | F21S 41/16 362/510 |
| 2013/0279151 | A1 | 10/2013 | Ouderkirk et al. | |
| 2013/0320190 | A1 | 12/2013 | Chu et al. | |
| 2014/0029282 | A1 * | 1/2014 | Ravier | F21S 48/17 362/510 |
| 2015/0176977 | A1 * | 6/2015 | Abele | G02B 26/0833 356/614 |
| 2015/0253469 | A1 * | 9/2015 | Le Gros | G02B 3/0006 359/619 |

OTHER PUBLICATIONS

International Search Report and Written Opinion issued in PCT/US2015/040857, dated Nov. 27, 2015, 17 pages.
International Preliminary Report on Patentability and Written Opinion issued in PCT/US2015/040857, dated Jan. 24, 2017, 8 pages.

* cited by examiner

LIGHTING ARRANGEMENT

TECHNICAL FIELD

The invention relates to the field of lighting systems to be used for instance in automotive headlights or camera flashes. More specifically, the present invention relates to lighting systems providing a controlled illumination pattern. The invention also relates to a corresponding illumination method and to a manufacturing method of a reflector element.

BACKGROUND OF THE INVENTION

Scanning mirror based light projection systems are known in the field of illumination systems. US2014/0029282 discloses an example of such a system, where the light source is a laser type light source. The advantage of using a laser light source is that laser-based illumination systems can generate very pure white light as explained later. A scanning mirror rotatable around two orthogonal axes is actuated and receives a light signal from a primary light source to project an image on to a phosphorous element. The light radiated by the primary light source, or more specifically its intensity, for example, can be modulated to project a desired image on to the phosphorous element. The phosphorous element is then arranged to perform a wavelength conversion of the light signal received from the primary light source. Consequently the phosphorous element acting as a secondary light source re-emits useful white light in different directions. In this kind of system a very high electrical-to-optical efficiency of the laser radiation and the phosphorous material can be obtained. Instead of using one scanning mirror rotatable around two orthogonal axes, it possible to use two mirrors instead, with each movable around one axis, where the two axes are orthogonal. This lighting system can be used for example in vehicle headlights.

However, it is difficult to optimally shape the light re-emitted by the phosphorous element so that the maximum light intensity is emitted in a desired direction. US2014/0029282 proposes to use a simple reflector behind the phosphorous element. The advantage of this solution is that the amount of light that goes in the desired direction, where the object to be illuminated is located, is increased compared to a solution that does not have this reflector. However, the problem now is that the light is reflected from the reflector in all directions. This means that again it is difficult to reshape the reflected light to make it appear like a normal light beam that can be used for illuminating a desired object.

SUMMARY OF THE INVENTION

It is an object of the present invention to overcome the problems identified above related to the shaping of light beams and/or directing them in a desired direction.

According to a first aspect of the invention, there is provided a laser based lighting system comprising:
- a laser light source for radiating light;
- a scanning mirror arrangement, arranged to be rotatable around two substantially orthogonal axes, for receiving the light radiated by the light source, and for reflecting the received light to a wavelength conversion element;
- the wavelength conversion element for receiving the light reflected by the scanning mirror arrangement and for re-emitting multi-spectral light;
- a reflector element for reflecting the light received from the wavelength conversion element towards an exit aperture of the lighting system, wherein the reflector element comprises a reflective surface and a micro-patterned surface comprising an array of micro-focal elements, said micro-focal elements being configured to converge or diverge incident light from the wavelength conversion element.

According to a variant of the first aspect, the light source is located on a first side of the wavelength conversion element, where the reflected light is arranged to exit the lighting system, and the reflector element is located on a second side of the wavelength conversion element, the second side being opposite to the first side.

According to another variant of the first aspect, the micro-focal elements are microlenses or micro-reflectors.

According to another variant of the first aspect, the micro-focal elements have a maximum dimension between 1 micrometers and 5 millimeters.

According to another variant of the first aspect, the array comprises between 10000 and 2250000 micro-focal elements. The array may comprise micro-focal elements of at least two different types. One type of micro-focal element is defined by its focal length, shape and/or size.

According to another variant of the first aspect, at least one of the micro-focal elements has a spherical shape.

According to another variant of the first aspect, at least one of the micro-focal elements has a cylindrical shape.

According to another variant of the first aspect, at least one of the micro-focal elements has an aspherical shape.

According to another variant of the first aspect, the array has a convex shape.

According to another variant of the first aspect, the array has a concave shape. The lighting system may further comprise a transparent layer located between the reflective surface and the micro-patterned surface.

According to another variant of the first aspect, the light reflected from the reflector element is arranged to pass through the wavelength conversion element towards the exit aperture.

According to another variant of the first aspect, the reflector element is oriented so that the light reflected from the reflector element exits the lighting system without being further reflected.

According to another variant of the first aspect, the wavelength conversion element comprises a phosphorous layer.

According to a second aspect of the invention, there is provided an illumination method for a lighting system comprising:
- a laser light source radiating light to a scanning mirror arrangement arranged to be rotatable around two substantially orthogonal axes;
- the scanning mirror arrangement reflecting the light received from the laser light source to a wavelength conversion element;
- the wavelength conversion element re-emitting broad-spectral light;
- a reflector element reflecting the light from the wavelength
- conversion element towards an exit aperture of the lighting system, wherein the reflector element comprises a reflective surface and a micro-patterned surface comprising an array of micro-focal elements, said micro-focal elements being configured to converge or diverge incident light from the wavelength conversion element.

According to a third aspect of the invention, there is provided a method of manufacturing a reflector element for a lighting system, the method comprising:

patterning a transparent substrate with a shaped mask by hot embossing, stamping or under pressure to create a micro-patterned surface;

curing the substrate comprising the micro-patterned surface; and depositing a reflective layer on to the substrate to create the reflector element.

According to a variant of the third aspect, the method further comprises depositing a phosphorous layer on to the reflector element.

According to another variant of the third aspect, the mask is on a roller, and the patterning is done by rotating the roller around its rotational axis while pushing the substrate against the roller and moving the substrate to allow various areas of the substrate to be patterned.

The proposed new solution has the advantage that the reflected light from the reflector element can be accurately shaped and radiated in a desired direction. Thus, the light can be radiated very precisely towards a desired location thanks to the micro-focal elements that are configured to converge or diverge incident light from the wavelength conversion element. Indeed, each of the micro-focal elements is arranged to precisely redirect the light coming from the wavelength conversion element. Therefore, shaping the beam can be done directly on the reflector, or more specifically by its reflective surface or by a combination of its reflective surface and optically transparent elements. Thus, no or minimal beam shaping needs to be done by other elements, such as an internal reflective surface of a housing, where the lighting system may be located. For example, relying on the reflective surface of the housing to do the beam forming has some limitations, as it typically only has a planar or curved reflective surface.

According to a second aspect of the invention, there is provided an illumination method as recited in claim 14.

According to a third aspect of the invention, there is provided a method of manufacturing a reflector element.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which:

FIGS. 2a to 2f are side views of the reflector element according to various examples of the present invention;

DETAILED DESCRIPTION OF AN EMBODIMENT OF THE INVENTION

Figure 1:
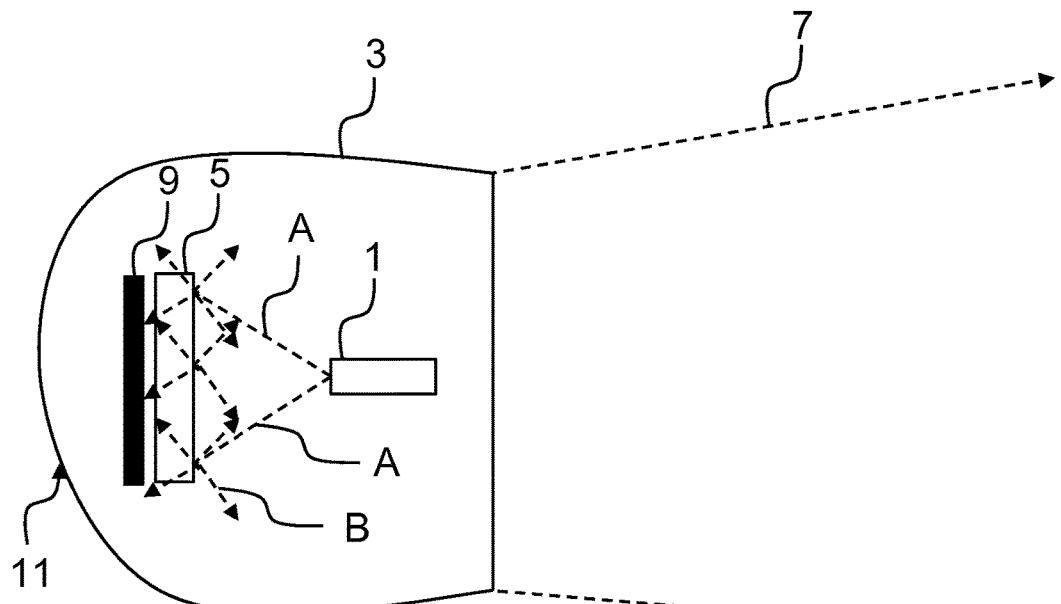
FIG. 1 is a simplified block diagram showing an exemplary lighting arrangement according to one aspect of the present invention.

An embodiment of the present invention will now be described in detail with reference to the attached figures. Identical or corresponding functional and structural elements which appear in the different drawings are assigned the same reference numerals.

FIG. 1 is a block diagram illustrating in a simplified manner an example of a lighting system according to an embodiment of the present invention. This arrangement may be used for example in the headlights of a vehicle, such as a car, or in photographic flash applications. A projection system 1 is shown inside a housing 3, which can have a reflective surface. The projection system does not need to be centred with respect to the other elements shown in FIG. 1. The projection system 1 in this example is a MEMS (micro-electromechanical system) scanning mirror based projection system. This projection system 1 comprises a scanning system, which in this example has one mirror arranged to be rotated around two orthogonal axes. However, the scanning system could also have two mirrors each arranged to be rotated around one of the two orthogonal axes. The scanning mirror may be actuated using magnetic, electrostatic, thermal or piezo-electric means. This kind of optical scanning systems is sometimes called a "scanner". The advantage of a scanning system is that a real image can be projected on to a wavelength conversion element 5, allowing the brightness of the image to be locally controlled so that as explained later the resulting projected and reflected light beam 7 can have local brightness adjustments to avoid dazzling drivers of oncoming vehicles when the lighting system is used in a vehicle headlight.

The projection system 1 also includes a light source, and more specifically a laser light source, which in this particular example emits an ultraviolet (UV) or near UV light having wavelength of 380 nm to 460 nm. However, any type of laser could be used, from UV light to visible light and infra-red light. The light source is arranged to emit light on to the scanning system. The laser beam generated by the light source is thus deviated along two directions by the scanning system and it emerges in a solid angle intercepting all or most of the surface of the wavelength conversion element 5, such as, for example, a phosphor plate or a plate on which preferably a continuous and homogeneous layer of phosphor has been deposited. Each point on the phosphor plate of the wavelength conversion element 5 receiving the laser beam A from the scanning system, typically monochromatic and coherent, absorbs the laser power and then re-emits a light B of a different wavelength. This light that can be considered as "white", since it contains a plurality of wavelengths between about 400 nm and 800 nm, i.e. in the visible light spectrum.

A reflector element 9 is placed behind the wavelength conversion element 5 and may have essentially the same surface area as the wavelength conversion element 5. The reflector element 9 is in this example a plate which is essentially parallel to the wavelength conversion element 5. According to the present invention the distance between the wavelength conversion element 5 and the reflector element 9 is typically between 0 cm to 15 cm. In other words, the wavelength conversion element may be in direct contact with the reflector element 5. The size of the reflector element is typically between 1 cm×1 cm and 10 cm×10 cm. The reflector element is arranged to reflect light emitted mainly by the wavelength conversion element 5 in a desired direction as explained later in more detail. Having the reflector on the rear side of the wavelength conversion element 5 has the advantage that no light, or only very little light, reaches the rear part 11 of the housing 3. However, instead of using a flat mirror as the reflector, according to the present invention a reflective array comprising micro-focal elements element is used. The micro-focal elements in this example are micro-lenses or micro-mirrors, also referred to as micro-reflectors, whose diameter may be in the range 1 μm to 5000 μm, for example, or more particularly in the range 50 μm to 1000 μm. Thus, if each of the lenses in the array is touching its neighbors, the array pitch is also in the range 1 μm to 5000 μm, for example, or more particularly in the range 50 μm to 1000 μm. The reflecting angle, also called a diffusing angle, of these lenses is from a few degrees up to 180 degrees. It is to be noted that one array may comprise a mixture of different micro-focal elements, for instance a mixture of micro-focal elements of different sizes, shapes and/or focal lengths. In other words, the micro-focal elements in one array do not have to be of the same type.

Figure 2A:
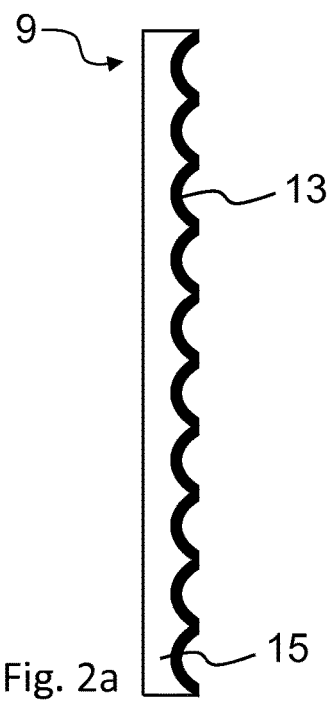
Figure 2B:
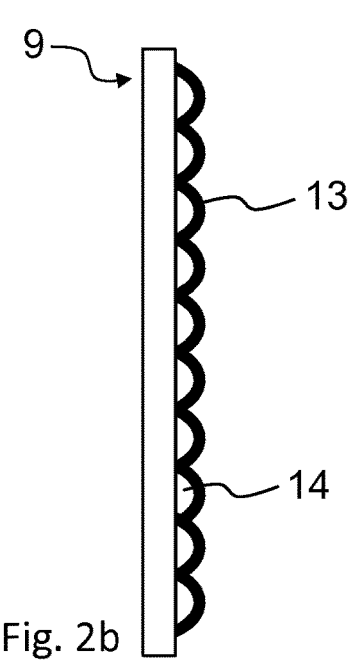
Figure 2C:
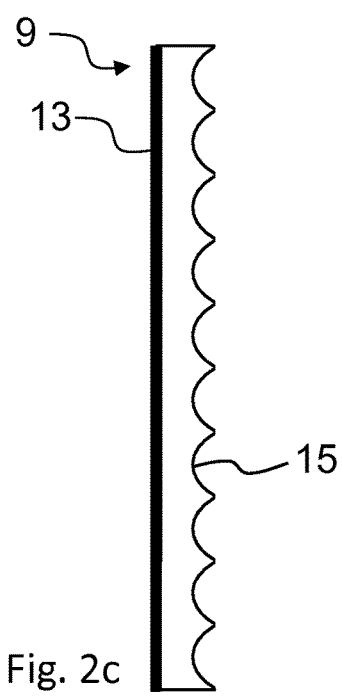

FIGS. 2a to 2f show various configurations in side view in which the micro-focal elements are arranged in the reflector element 9 to form an array of micro-focal elements. The array may have a regular or irregular shape and/or orientation. As can be seen, the reflector element 9 comprises a reflecting surface 13, which may be placed either on a micro-patterned element 14 or behind the lenses 15, when seen from the direction where the projection system 1 is located. In FIG. 2d the reflector element 9 also comprises an additional substrate 17 between the reflecting surface 13 and the lenses 15. This additional substrate is transparent like the lenses and may be of the same or different material as the lenses 15. There may be further transparent layers provided between the lenses 15 and the reflective surface 13. The material of the lenses 15 may be for instance glass or a polymer such as a thermally or UV cured polymer. The shape of the individual lenses may be for example spherical or cylindrical. Or the shape may also be for example aspherical. These shapes have the particular advantage that the reflected angle can be different from one orientation to another.

In the configurations of FIGS. 2a to 2d, the micro-focal elements extend in essentially one flat plane. This configuration requires the minimum of space. However, the reflector element 9 in FIG. 2e has a convex, spherical, cylindrical or aspherical overall shape, whereas the reflector element in FIG. 2f has a concave, spherical, cylindrical or aspherical shape. These configurations are useful if a particular beam shape is desired. The configurations of FIGS. 2e and 2f could also be modified by combining the convex or concave array shape with the micro-focal element and reflecting surface configuration of FIG. 2c or 2d. In other words, the microlens array could have the convex or concave shape as in FIG. 2e or 2f, respectively, but with the reflective surface behind the microlenses so that the light arriving from the wavelength conversion element 5 first passes through the lenses before reaching the reflecting surface whereupon the reflected light again passes back through the lenses, but in the opposite direction. Indeed, in the configurations of FIGS. 2c and 2d, the light arriving from the wavelength conversion element 5 is arranged to pass twice through the lenses, namely a first time when it arrives from the wavelength conversion element 5, and a second time when it has been reflected by the reflective surface 13. This has the further advantage that more efficiency to the shaping of the light beam is provided, as the light arriving from the wavelength conversion element 5 passes two times through the optical beam shaping optics, therefore providing more flexibility in terms of possible optical beam shaping.

As the reflector element 9 has an array of specifically shaped optical elements, the reflected light beam can then be shaped more accurately than without these optical elements, and the use of the reflected or re-emitted light can be made more efficient as it will be radiated directly in the right direction and having a desired beam shape. The proposed advanced reflector element 9 thus provides a beam shaping capability. For example, the reflected light from the reflected element 9 may be shaped to exit directly the headlight without first being reflected from the surface of the housing 3. Indeed, any internal reflection from the surface of the housing 3 generates a light loss because that surface typically only has a reflectivity of 85%. Thus, in this case it represents a light loss of 15%. It is also to be noted that thanks to the lens array, there is no need to have any supplementary optical imaging systems in the lighting arrangement to direct the light beams in a desired direction.

Figure 3:
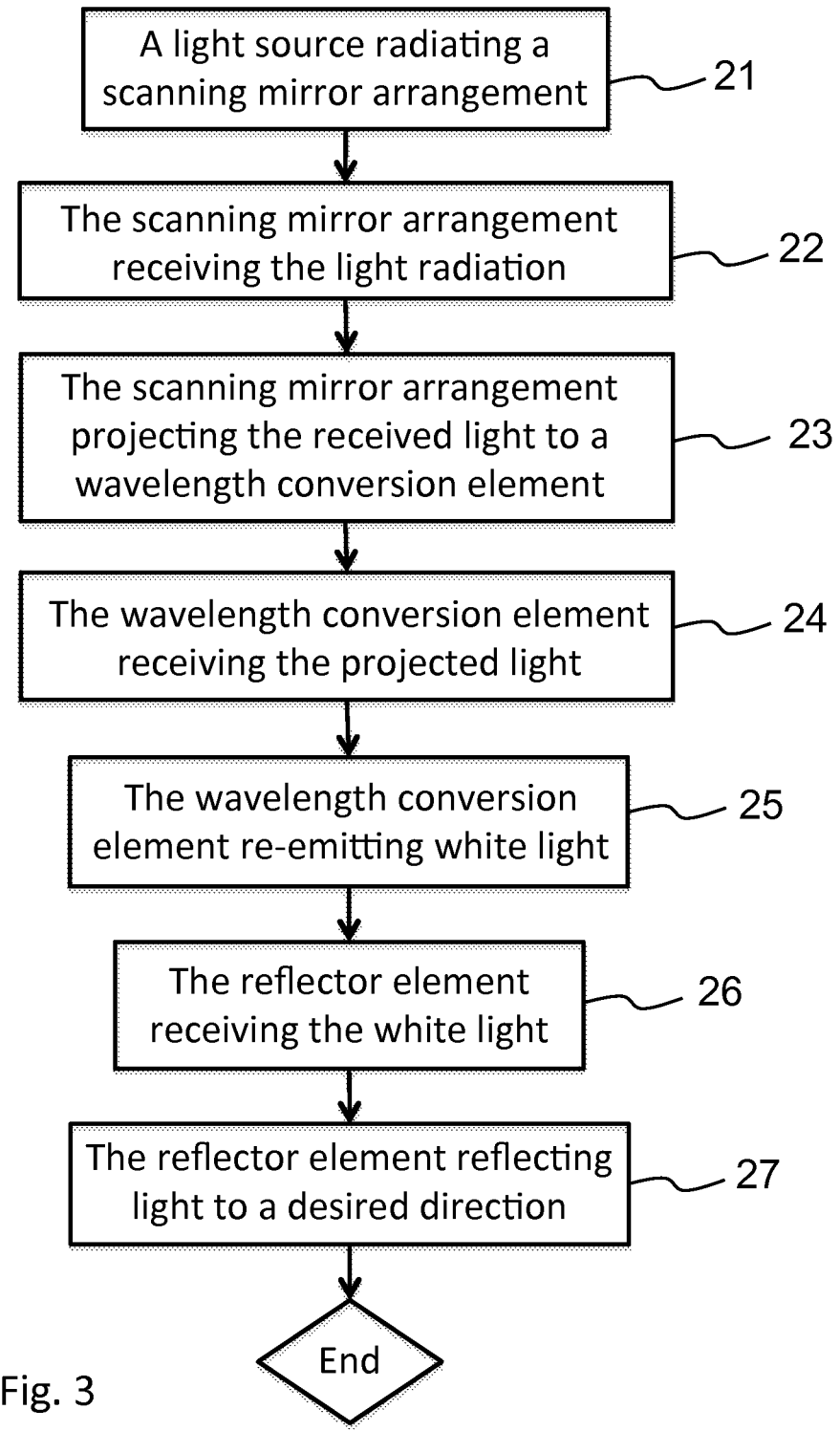
FIG. 3 is a simplified flow diagram illustrating a method of illuminating an object according to one aspect of the present invention.

The flow chart of FIG. 3 summarises the method of illuminating an object by using the teachings above. In step 21 the laser light source radiates laser light. In step 22 this radiation is received by the scanning mirror arrangement. In step 23 this mirror arrangement projects, i.e. spatially distributes, an image towards the wavelength conversion element 5. In step 24 the wavelength conversion element receives this light and in step 25 converts the received radiation to multiple wavelengths and re-emits this broad-spectral light. In step 26 the reflector element receives this light and in step 27 it reflects this light in a desired direction.

Figure 5:
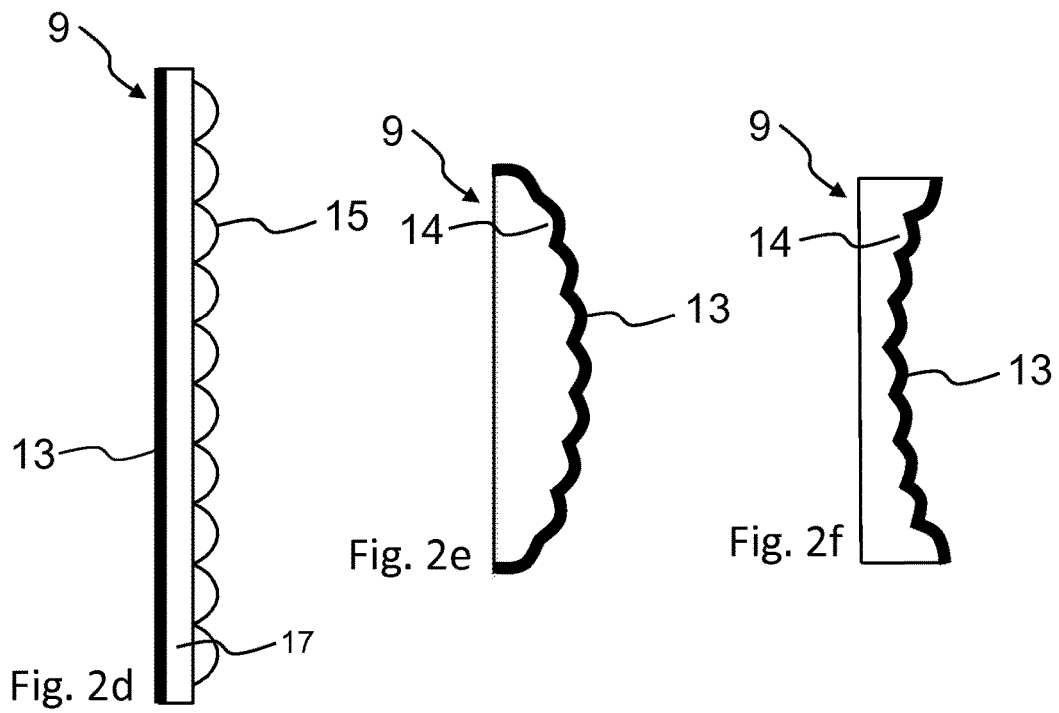
FIG. 5 illustrates some elements involved in the manufacturing process described in the flow chart of FIG. 4.
Figure 5:
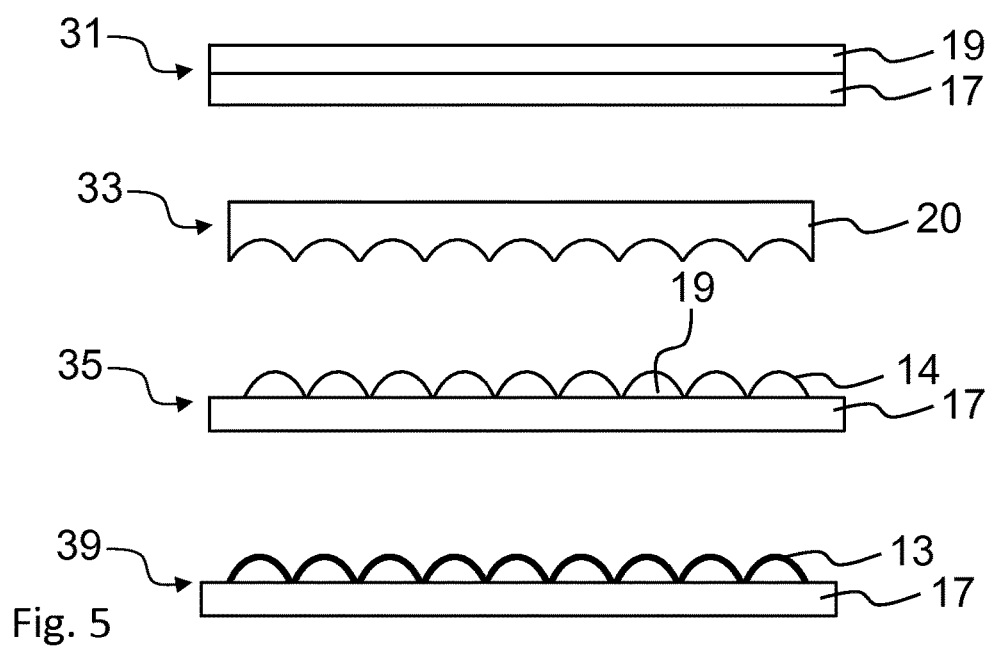
Figure 4:
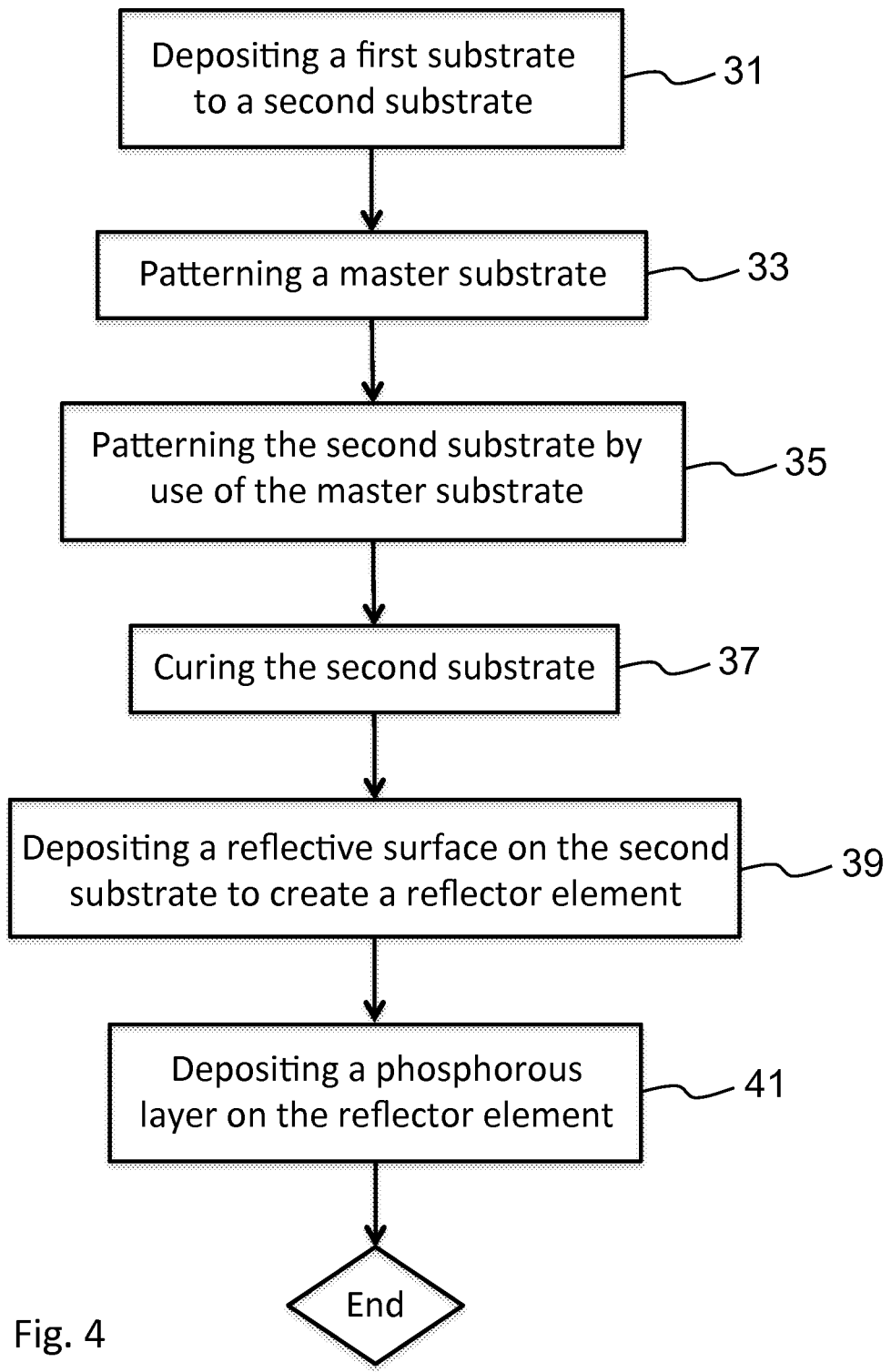
FIG. 4 is a flow diagram illustrating an exemplary manufacturing process of the reflector element according to one aspect of the present invention.

FIG. 4 is a flow chart illustrating the manufacturing process of the reflector element according to one example. The following description of the manufacturing process is better understood when read with reference to FIG. 4 showing in side view some elements which are used in the manufacturing process. In FIG. 5, the reference numerals on the left refer to the manufacturing steps of the flow chart of FIG. 4. The process starts in step 31 by depositing or laminating a first substrate also referred to as a micro-pattern substrate 19 on to a second substrate 17 also referred to as a supporting substrate. In step 33 a third substrate also referred to as a master substrate 20 or a mask or a mould, is patterned so that the mask has a pattern that is inverted or opposite to the desired form of the micro-pattern. All these three substrates may be of the same material, for instance glass or polymer, as explained above. However, typically the master substrate may be made of copper or nickel material. In step 35 the lens substrate is patterned by use of the master substrate to generate the micro-patterned elements 14 on the substrate surface. This is done either by hot embossing, stamping and/or by applying pressure. The master substrate may be on a roller or drum, or may also be the drum or roller itself after patterning, arranged to rotate around its rotational axis, and the manufacturing process may be carried out by a roll-to-roll process. The roller or drum is typically a cylindrical element. During operation, the substrates 17 and 19 are arranged to be pushed against the roll, while at the same time moving these substrates to allow patterning different areas of the micro-pattern substrate 19. In step 37 the micro-pattern substrate is cured to make this layer 19 stiff or rigid. In step 39 a reflective surface 13 is deposited on to the surface of the lenses or on to the surface of the supporting substrate 17 to create the reflector element 9. This surface may be a metal surface, such as aluminium, silver or gold surface, possibly combined with a protective surface to avoid corrosion. This protective coating may for instance be a silicon dioxide, silicon nitride, titanium oxide or tantalum pentoxide coating or a stack of several of those materials or another dielectric stack. Optionally in step 41 a phosphorous layer 5 is deposited or laminated on to the reflector element 9. However, this step is only needed if the wavelength conversion element 5 is to be in direct contact with the reflector element 9. The thickness of the phosphorous layer is typically around 5 mm, but may be in the range of 100 μm to 5 cm. In the above process, if the micro-patterning requires a pressure control chamber, then the same chamber can advantageously be used to deposit the reflective material. Furthermore, in the above manufacturing process, the substrates 17 and 19 may be a single substrate or that the substrate 17 may be removed after the micro-patterned elements 14 have been formed.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A lighting system comprising:
   a laser light source;
   a scanning mirror arranged to rotate around two substantially orthogonal axes, the scanning mirror to receive light radiated by the laser light source and to reflect the received light;
   a wavelength conversion element to receive the light reflected by the scanning mirror and to emit multi-spectral light; and
   a reflector element non-coupled to and spatially separate from the wavelength conversion element, the reflector element comprising:
      an array of a plurality of micro-focal elements to receive the multi-spectral light emitted from the wavelength conversion element and to converge or diverge the received multi-spectral light, wherein the array comprises at least one first micro-focal element having a first concave shape and at least one second micro-focal element having a second convex shape; and
      a reflective surface to reflect the converged or diverged multi-spectral light towards an exit aperture.

2. The lighting system according to claim 1, wherein the laser light source is located on a first side of the wavelength conversion element, where the reflected light is arranged to exit the lighting system, and the reflector element is located on a second side of the wavelength conversion element, the second side being opposite to the first side.

3. The lighting system according to claim 1, wherein the plurality of micro-focal elements are microlenses or micro-reflectors.

4. The lighting system according to claim 1, wherein the plurality of micro-focal elements have a maximum dimension between 1 micrometers and 5 millimeters.

5. The lighting system according to claim 1, wherein the array comprises between 10,000 and 2,250,000 micro-focal elements.

6. The lighting system according to claim 1, wherein the array comprises micro-focal elements of at least two different types.

7. The lighting system according to claim 6, wherein one type of micro-focal element is defined by at least one of a focal length, or a size.

8. The lighting system according to claim 1, wherein the second convex shape of the micro-focal elements corresponds to a spherical shape.

9. The lighting system according to claim 1, wherein the first concave shape of the micro-focal elements corresponds to a cylindrical shape.

10. The lighting system according to claim 1, wherein at least one of the first shape or the second shape of the micro-focal elements corresponds to an aspherical shape.

11. The lighting system according to claim 1, wherein the light reflected from the reflector element is arranged to pass through the wavelength conversion element towards the exit aperture.

12. The lighting system according to claim 1, wherein the reflector element is oriented so that the light reflected from the reflector element exits the lighting system without being further reflected.

13. The lighting system according to claim 1, wherein the wavelength conversion element comprises a phosphorous layer.

14. A method, comprising:
   radiating light to a scanning mirror arrangement arranged to be rotatable around two substantially orthogonal axes;
   reflecting the radiated light to a wavelength conversion element;
   re-emitting, from the wavelength conversion element, broad-spectral light;
   converging or diverging, at an array of a plurality of micro-focal elements, the broad-spectral light re-emitted by the wavelength conversion element,
   wherein the array comprises at least one first micro-focal element having a first concave shape and at least one second micro-focal element having a second convex shape; and
   reflecting the converged or diverged light towards an exit aperture of a lighting system by a reflector element physically non-coupled to and spatially separate from the wavelength conversion element.

* * * * *